INVENTORS
K. MURAKAMI
O. ISHIKAWA
S. SHIMIZU
S. IMANO
H. MORIMOTO

BY *Wenderoth, Lind & Ponack*
ATTORNEYS

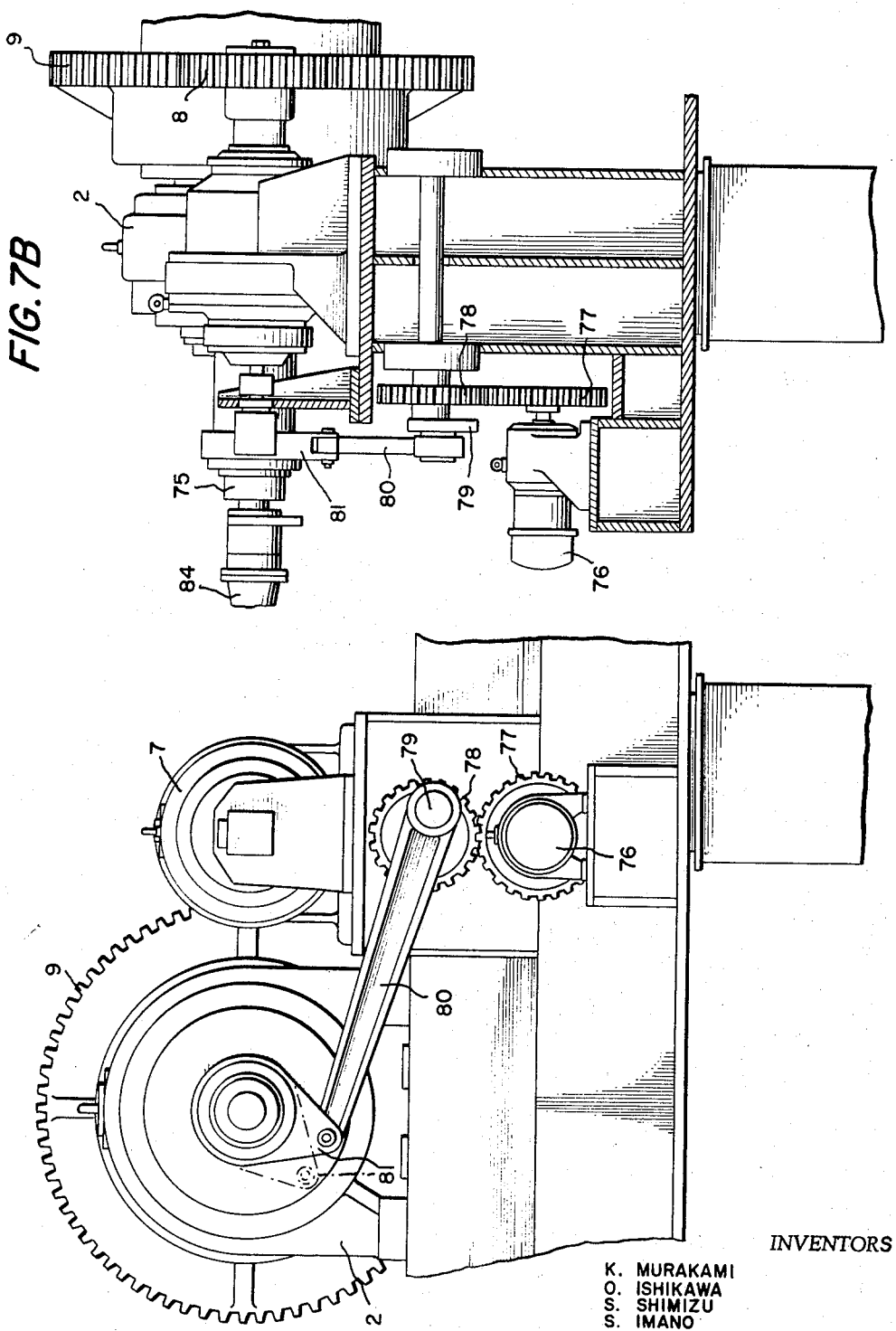

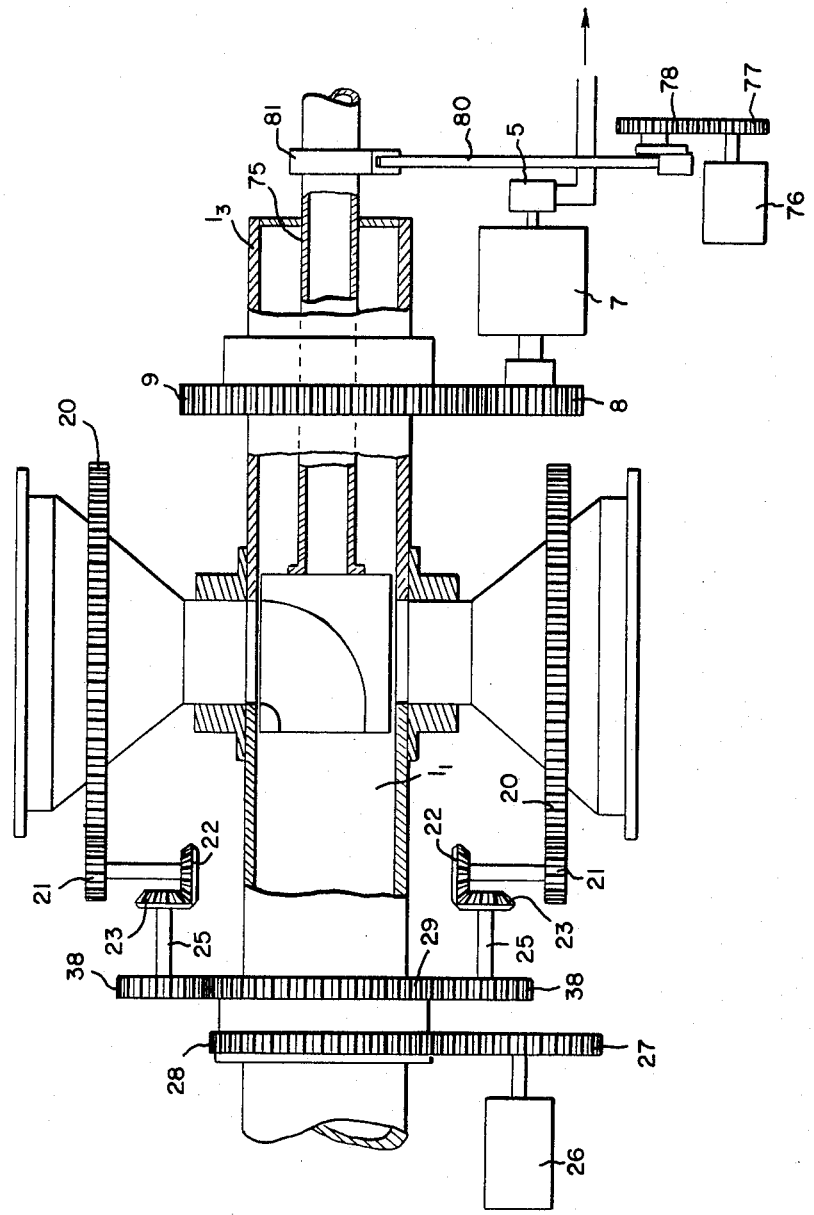

United States Patent Office 3,408,693
Patented Nov. 5, 1968

3,408,693
APPARATUS FOR MOLDING REINFORCED PLASTICS
Kenkichi Murakami, Kyotoshi, Osamu Ishikawa, Hirakatashi, Shigeru Shimizu, Osakashi, Shiro Imano, Sakaishi, and Hisao Morimoto, Otokunigun, Japan, assignors to Sekisui Kagaku Kogyo Kabushiki Kaisha, Osakashi, Japan, a corporation of Japan
Filed Feb. 2, 1966, Ser. No. 524,441
7 Claims. (Cl. 18—5)

ABSTRACT OF THE DISCLOSURE

An apparatus for producing reinforced molded plastic articles. It comprises a frame, a hollow shaft rotatably mounted on said frame, and shaft rotating means coupled to said shaft for rotating said shaft intermittently. A plurality of preforming screens and shaping molds are mounted alternately at spaced positions around said shaft, and a preforming chamber is mounted on said frame adjacent the path of said screens and molds and means for supplying a reinforcement material onto the preforming screens. Said screens and molds pass through said preforming chamber during rotation of said shaft. A compression molding means on said frame has a further shaping mold complementary in shape to the molds on said shaft and movable back and forth toward and away from a position in the path of said molds and screens. Said preforming chamber and compression molding means are positioned so that when a mold on the shaft stops at the position of the compression molding means, a preforming screen is in the preforming chamber. A transfer valve is provided in said shaft and around which said shaft rotates.

---

This invention relates to an apparatus for producing reinforced plastics. More particularly this invention relates to an apparatus for producing reinforced plastics by continuously preforming reinforcement materials in the first step and transferring preformed articles into a shaping mould and molding them into desired reinforced plastics products continuously and efficiently.

Previously in molding of such reinforced plastics, preformers used have been entirely different and separate from the molder and pre-formed articles had to be transported to molders. For example, a rotary-type automatic preforming machine supplied from I. G. Brenner Co. is as its name implies, nothing but an apparatus which carries out a preforming operation automatically by using a rotary system. Finished preformed articles must be removed and charged to a metal mold of molder manually.

Accordingly, it is an object of the present invention to provide a shaping apparatus for reinforced plastics which is capable of eliminating the inconvenience of transporting articles between conventional preformers and conventional molders and rendering operations from preforming to molding wholly automatic.

Such an object can be attained by the apparatus of the present invention, consisting of an intermittently rotatable shaft installed above compression molding means, a plural number of preforming screens and shaping molds arranged alternately at a regular interval circumferentially around the above-mentioned shaft and capable of passing through the inside of a preforming chamber and a position above a different shaping mold which is complementary to the above-mentioned shaping mold, a transfer valve which is installed in the above-mentioned shaft and allows the vacant space of the preforming screen to communicate with a vacuum chamber through the transfer valve when the preforming screen is in the preforming chamber so as to create an attractive force for attracting the preforming material onto the surface of the preforming screen and to communicate with a high pressure chamber through the transfer valve when the preforming screen, after leaving the preforming chamber and after a suitable amount of rotation, comes to a different shaping mold of the said compression molding means so as to flow high pressure air upon the surface of said preforming screen. The apparatus also has means to introduce said molding material into the said different mold of the compression molding means and means to move the above-mentioned different mold of the compression molding means upward when the above-mentioned molding material is introduced therein and means to move the shaping mold arranged circumferentially around the said axis in order to contact it with the above-mentioned shaping mold and subject the material in the mold of the compression molding means to compression molding.

Figure 1:
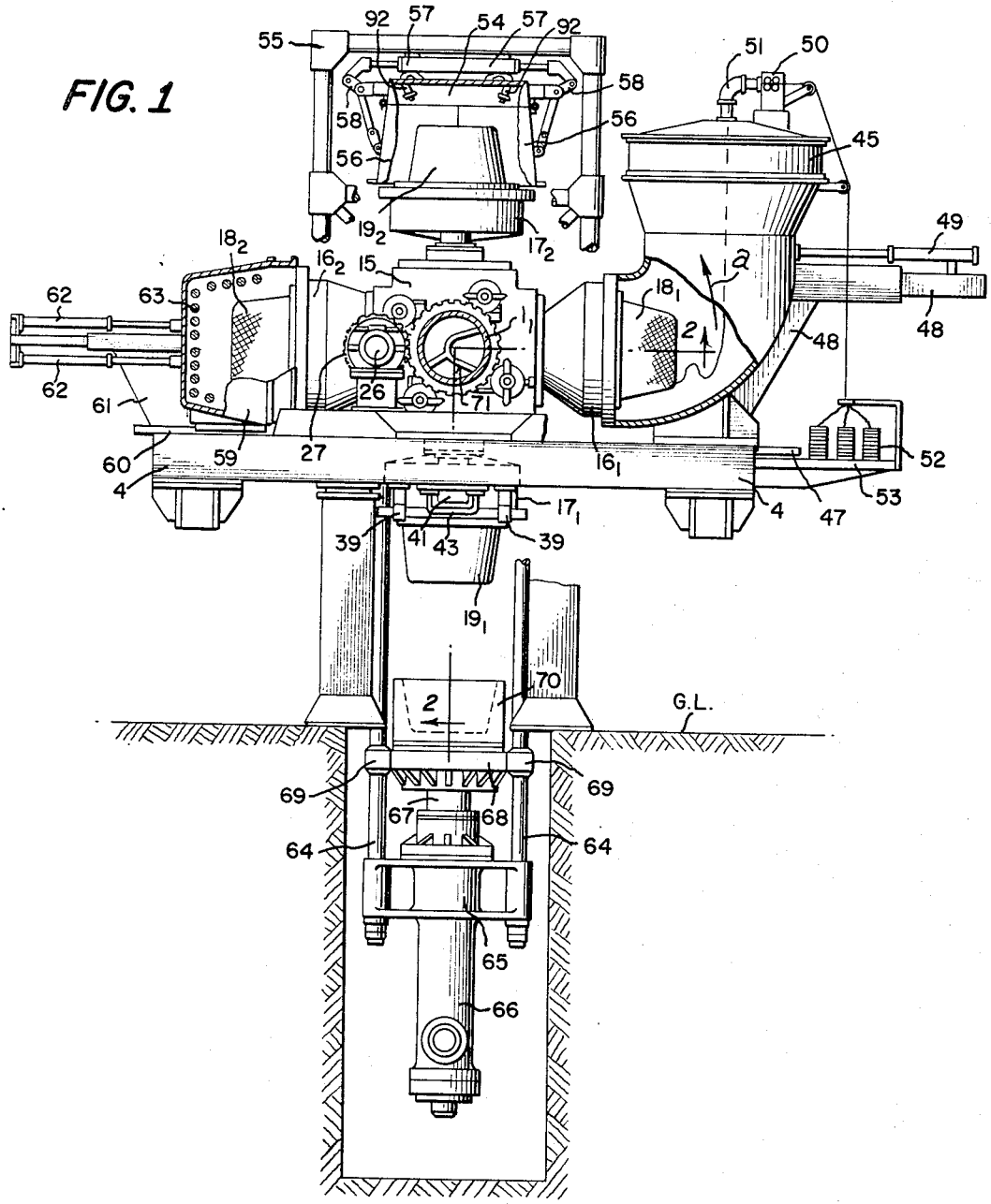
Figure 2:
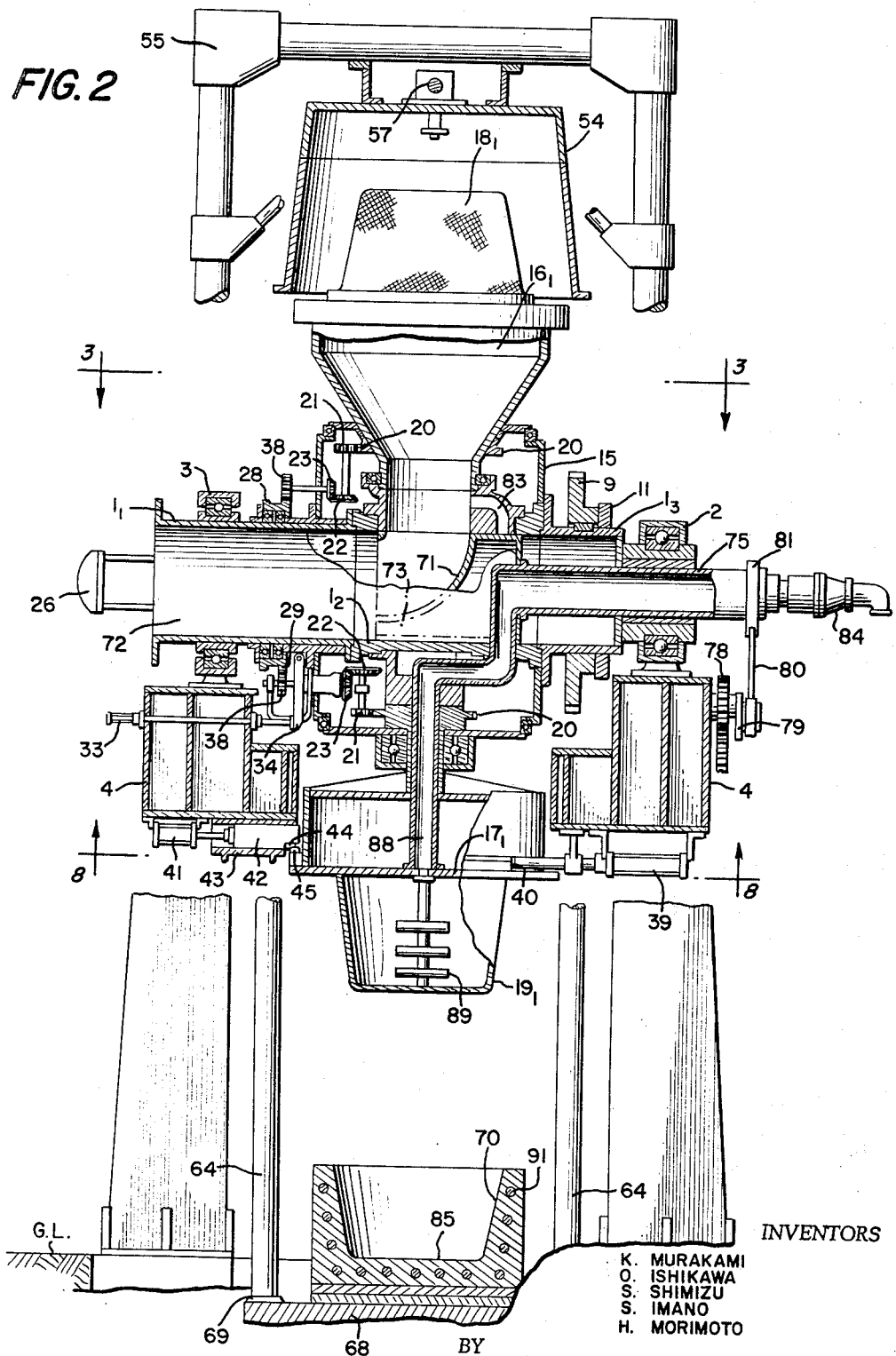
Figure 3:
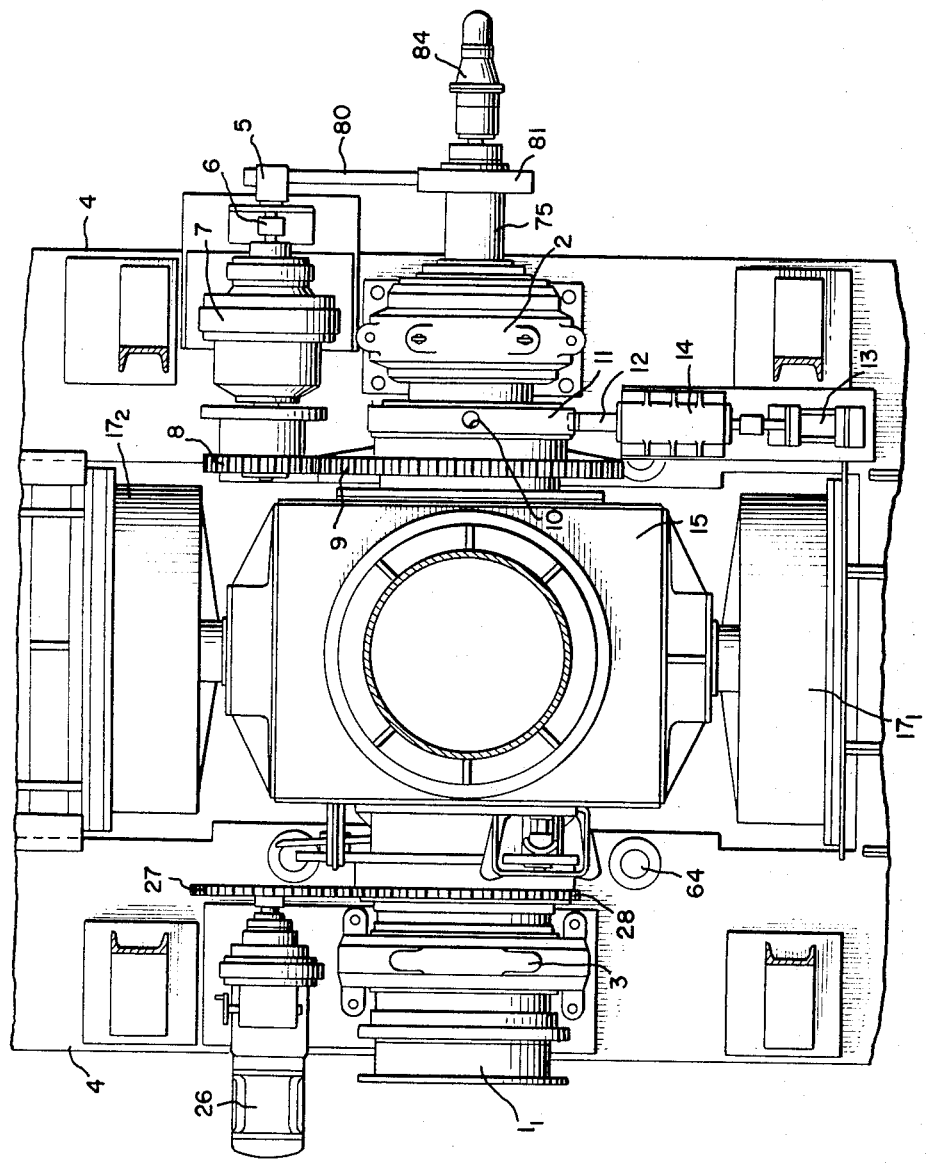
Figure 4:
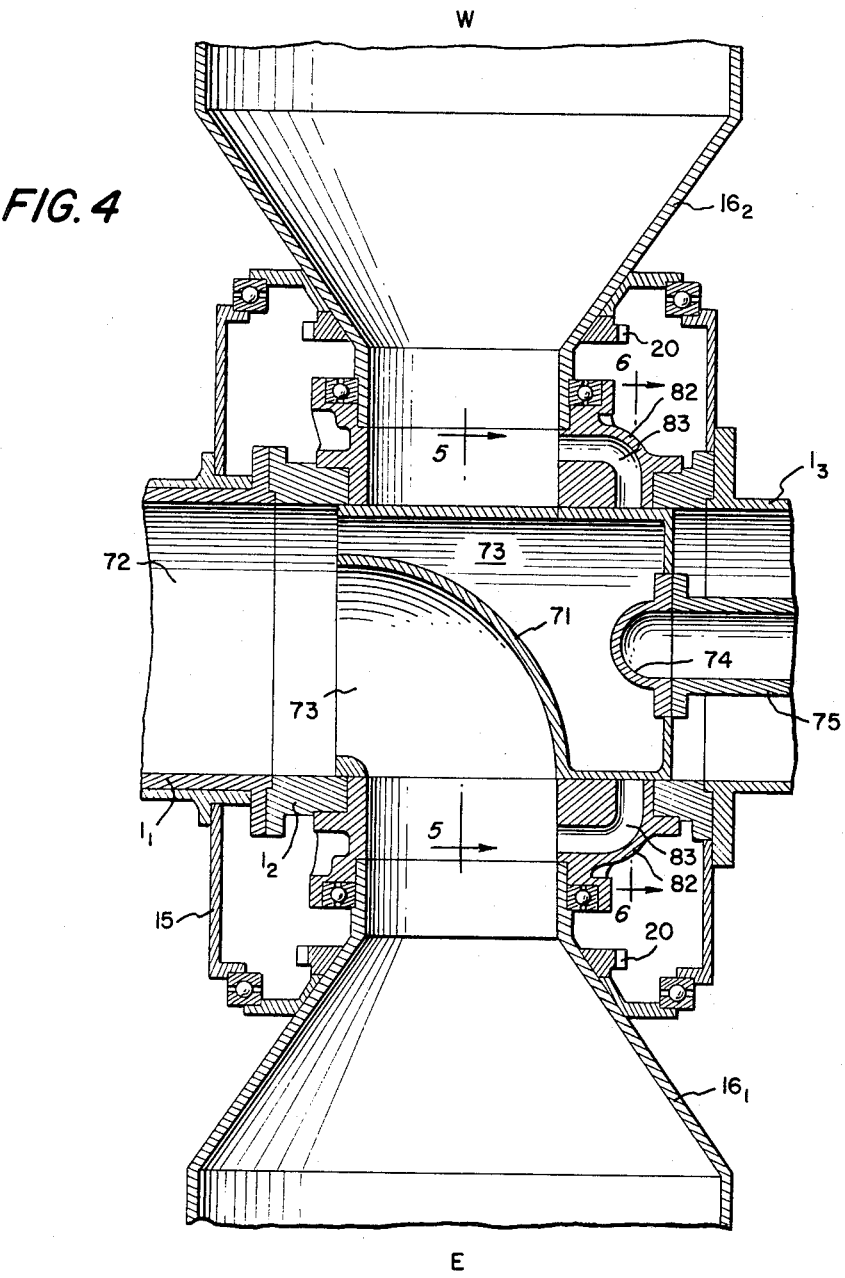
Figure 5A:
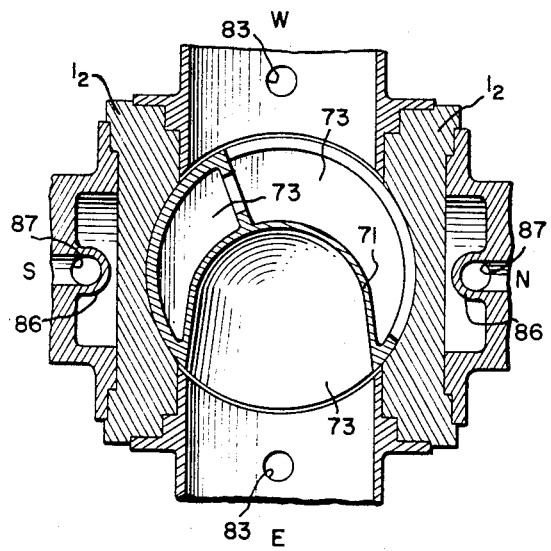
Figure 5B:
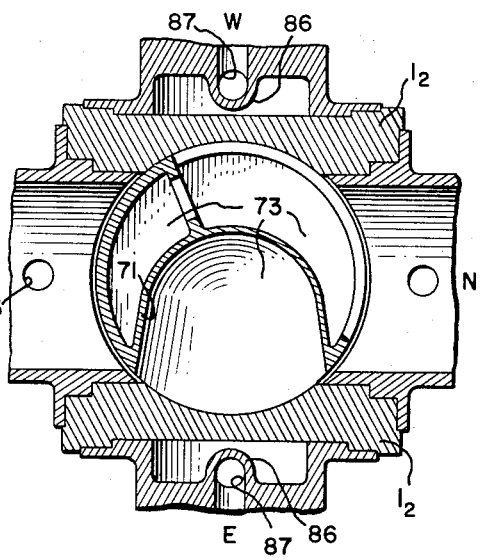
Figure 6A:
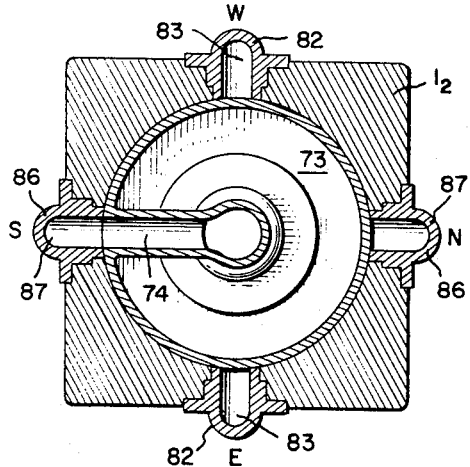
Figure 6B:
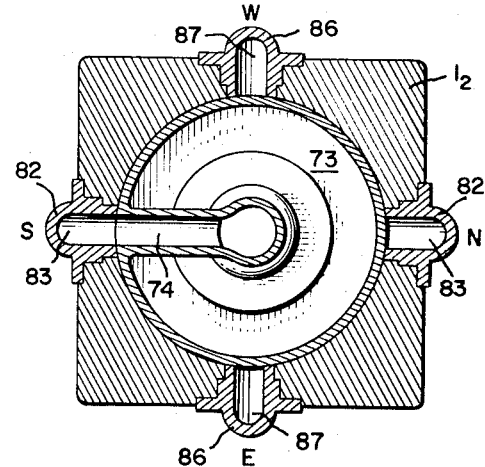
Figure 8:
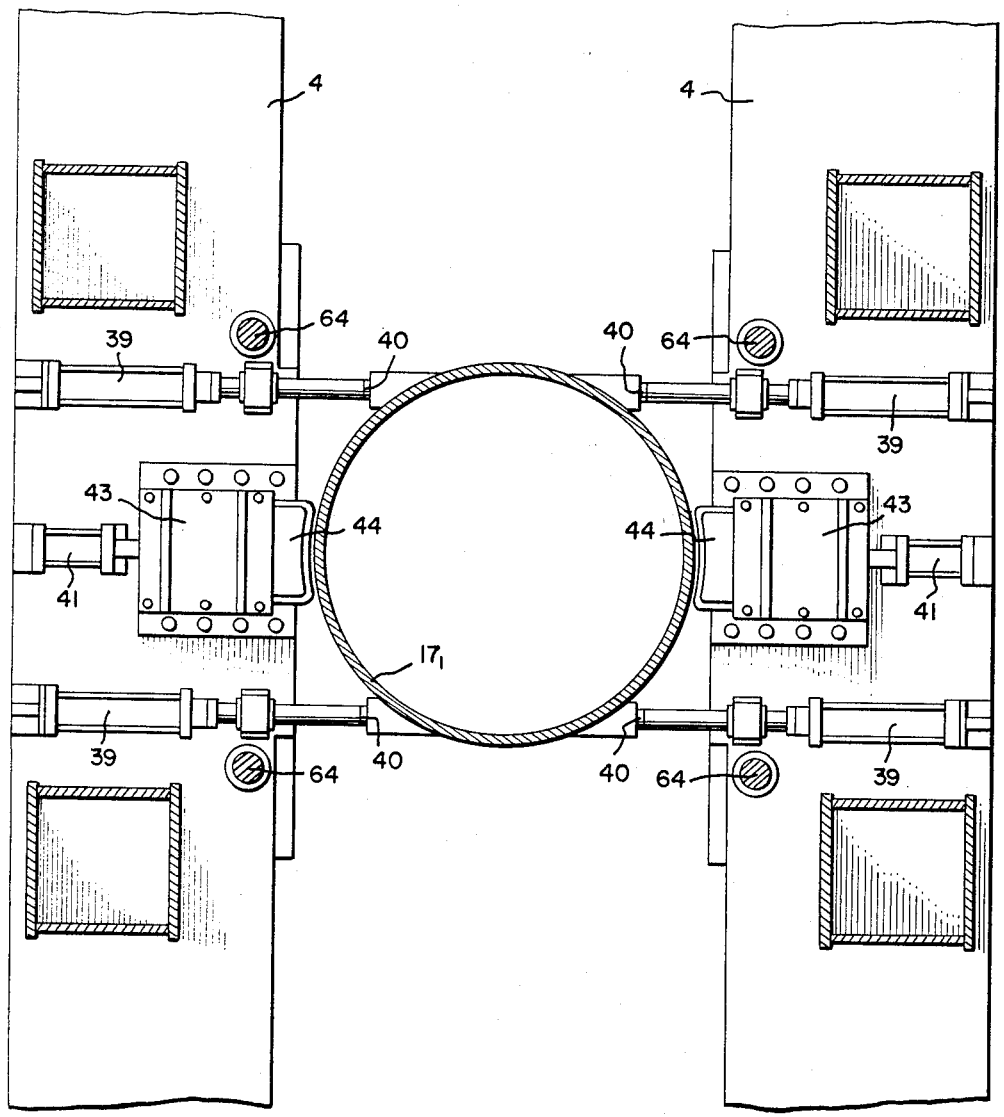
Figure 9:
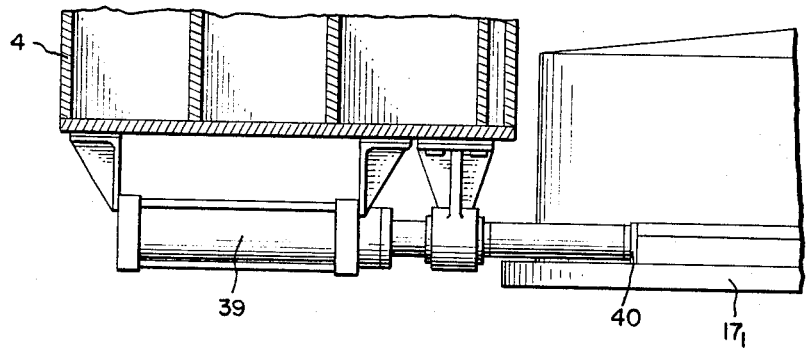
Figure 10:
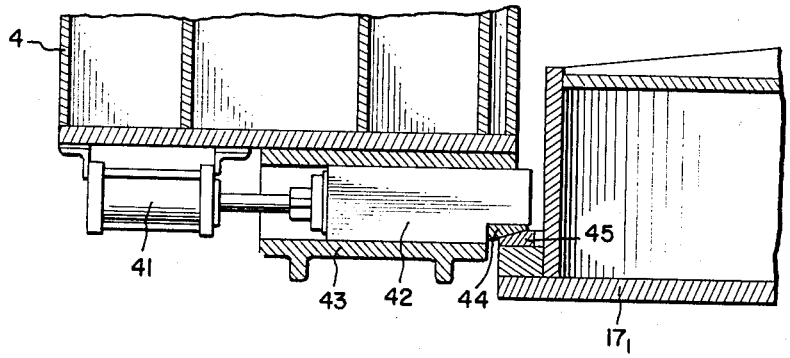
Figure 11:
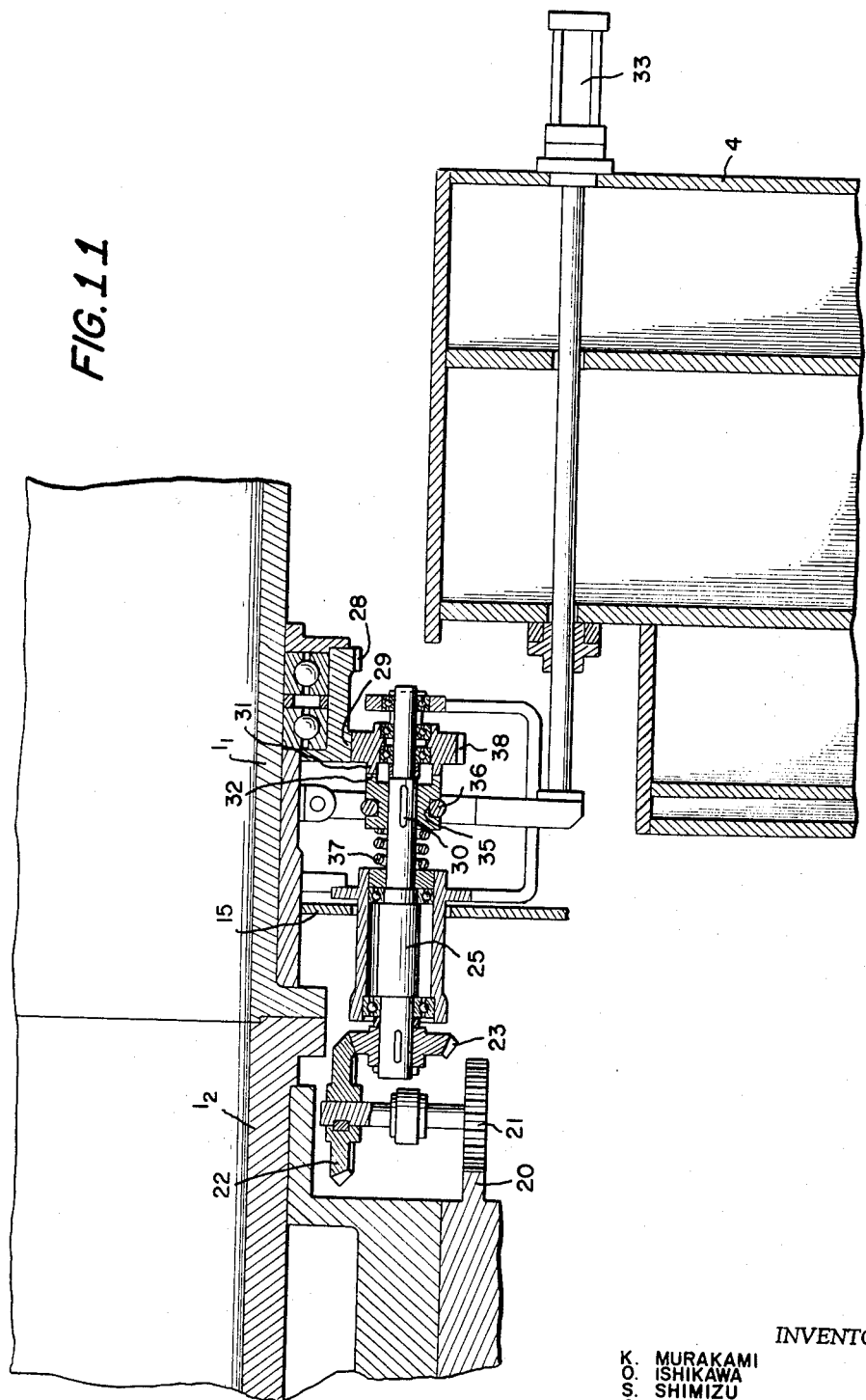

A preferred embodiment of the invention has been chosen for purposes of illustration and description and is shown in the accompanying drawing, forming a part of the specification, wherein FIGURE 1 is an elevation view partly in section, of the apparatus for shaping reinforced plastics of this invention; FIGURE 2 is a cross-sectional view taken along the line 2—2 of FIGURE 1 and showing the position after a mold has been rotated upward by an angle of 90°; FIGURE 3 is a transverse cross-sectional plan view of the apparatus of FIGURE 2 taken along the line 3—3 of FIGURE 2; FIGURE 4 is a sectional view showing details of the transfer valve part, wherein E is the preforming zone, N is a spray zone, W is a heating zone, and S indicates the positions of the compression molding means; FIGURES 5A and 5B are cross-sectional views of the transfer valve part taken along the line 5—5 of FIGURE 4 wherein FIGURE 5A shows the position of the transfer valve part at the time when the preforming screen is in the preforming zone E and the heating zone W and the male mold is in the spray zone N and compression molding means S and FIGURE 5B shows the position of the transfer valve part at the time when the shaft rotates counterclockwise by angle of 90° from the position of FIGURE 5A and the male mold is in the preforming zone E and heating zone W and the screen is in the spray zone N and compression molding means S; FIGURES 6A and 6B are cross-section views of the transfer valve part taken along the line 6—6 of FIGURE 4 with the valve part in positions corresponding to the positions of the valve part in FIGURES 5A and 5B; FIGURES 7A and 7B are side and end elevation views showing details of driving means for the transfer valve; FIGURE 8 is a plan view taken along the line 8—8 of FIGURE 2 and showing the actions of a position fixing means of the turn table and a claw part; FIGURE 9 is a side view of the means for fixing the position of the turn table; FIGURE 10 is a vertical cross-sectional view showing the details of the claw part; FIGURE 11 is a cross-sectional view showing the details of a clutch part; and FIGURE 12 is a diagram showing the driving system for the shaft, turn table and transfer valve.

Referring first to FIGURE 1, a tubular shaft 1 is as indicated in FIGURE 2, separated into three parts $1_1$, $1_2$ and $1_3$, connected with flange members. The shaft made up of parts $1_1$, $1_2$ and $1_3$ performs intermittent rotation through an angle of 90° for each rotation and the shaft parts are supported by bearings 2 and 3 mounted upon a frame 4. On the shaft made up of parts $1_1$, $1_2$ and $1_3$, there are provided a first set of two diametrically opposed turn tables $16_1$ and $16_2$ and another set of two diametrically opposed turn tables $17_1$ and $17_2$ carried by a rotation frame 15. Upon the respective turn tables $16_1$ and $16_2$ is a preforming screen $18_1$ and $18_2$ and upon the respective turn tables $17_1$ and $17_2$ is a shaping male mold $19_1$, and $19_2$.

With the rotation of the shaft made up of the parts $1_1$, $1_2$, and $1_3$ in the direction of arrow $a$ in increments of 90°, each of the turn tables $16_1$, $16_2$, $17_1$, and $17_2$ and the preforming screens $18_1$ and $18_2$, and the shaping male molds $19_1$ and $19_2$ change their position by an angle of 90° and stop at the positions just above, under, right of and left of the shaft parts $1_1$, $1_2$, and $1_3$. A preforming chamber 46 is provided which is capable of sliding freely back and forth upon a slide plate 47 fitted upon the top of the frame 4 by the action of an air cylinder 49 fitted upon a table 48 fitted on the frame 4 on the backside of the preforming chamber. This air cylinder 49 is operative during the entire period of the time from the time when the preforming screens $18_1$ and $18_2$ and the shaping molds $19_1$ and $19_2$ rotate with the rotation of the shaft parts $1_1$, $1_2$, and $1_3$ and stop at the position just above, under, right of and left of the shaft parts $1_1$, $1_2$, and $1_3$ and a position fixing pin 12 enters a hole 10 of the position fixing circular plate 11 (refer to FIG. 2 and FIG. 3) to complete the position fixing as described later relative to FIGURE 3 thereby causing the preforming chamber 46 to stop at the forward position. As soon as the timer controlling the dwell time is switched off, the air cylinder 49 works in the reverse direction so as to force the preforming chamber 46 retreat along the slide plate 47 for a predetermined period of time. During the retreat of the preforming chamber 46, the shaft parts $1_1$, $1_2$, and $1_3$ can perform the rotation in the direction of arrow $a$ through an angle 90°. Further when the preforming screens $18_1$ and $18_2$ and the shaping male molds $19_1$ and $19_2$ reach the position just above, under, left of and right of the shaft parts and the position of the shafts $1_1$, $1_2$, and $1_3$ is thus fixed, the air cylinder 49 performs the normal operation, forces the preforming chamber 46 to advance and maintains the preforming chamber 46 at that position during the time when the timer is working. A fiber cutter 50 is mounted on the top of the preforming chamber 46 and a pipe 51 which sends the glass fibers cut by the fiber cutter 50 to the preforming chamber 46. Rovings 52 of glass fibers are carried on a bracket 53.

The cutter 50 works for a fixed period of time when the preforming chamber 46 is still standing at an advanced fixed position in order to cut the rovings of glass fibers to a suitable length and send the cut fiber into the preforming chamber 46 through the pipe 51. A spray chamber 54 is mounted on a truss 55 mounted on the frame 4. A door 56 of the spray chamber 54 is opened or closed by the action of an air cylinder 57 mounted on the top of the spray chamber 54, the action of the air cylinder 57 being transmitted through links 58. This air cylinder 57 works to close the door 56 of the spray chamber 54 during the entire period of time when the timer (not shown in the figures) is working, starting from the time when the preforming screens $18_1$ and $18_2$ and shaping male molds $19_1$ and $19_2$ rotate with the rotation of the shaft parts $1_1$, $1_2$, and $1_3$, stop at the position just above, under, right of and left of the shafts $1_1$, $1_2$, and $1_3$, and the time when the above-mentioned position-fixing pin 12 enters the hole 10 of the position fixing plate 11 and the fixing of the position of these parts is finished. As soon as the timer is switched off, the air cylinder 57 works in the reverse direction and keeps the door 56 of the spray chamber 54 open for a fixed period of time. During the time when this door 56 is opened, the shaft parts $1_1$, $1_2$, and $1_3$ rotate in the direction of arrow $a$ through an angle of 90°. When the preforming screens $18_1$ and $18_2$ and the shaping male molds $19_1$ and $19_2$ reach the position just above, under, left of and right of the shafts $1_1$, $1_2$, and $1_3$ and the position of the shaft parts $1_1$, $1_2$, and $1_3$ is fixed as above-mentioned, the air cylinder 57 performs a normal operation and during the time when the timer (not shown in the figure) is working, and the door 56 is maintained in the closed state. A spray gun 92 is fitted on the spray chamber 54. A heating chamber 59 is slidable back and forth upon a sliding plate 60 mounted upon the top surface of the frame 4 by the action of an air cylinder 62 mounted upon a bed plate 61 placed on the top surface of the frame 4. This air cylinder 62 keeps the heating chamber 59 at the forward position during the entire period of time when the timer (not shown in the figure) is working, starting from the time when the preforming screens $18_1$ and $18_2$, and the shaping male molds, $19_1$ and $19_2$ rotate with the rotation of the shaft parts $1_1$, $1_2$, and $1_3$, stop at the position just above, under, left of, and right of the shafts $1_1$, $1_2$, and $1_3$, and the position fixing pin 12 enters the hole 10 of the position fixing circular plate 11 and the position is fixed. As soon as the timer is switched off, the air cylinder 62 works in the reverse direction, forcing the heating chamber 59 to retreat backward along the sliding plate 60 for a definite period of time. During the time the heating chamber 59 is withdrawn, the shaft parts $1_1$, $1_2$, and $1_3$ rotate in the direction of arrow $a$ through an angle of 90°. When the preforming screens $18_1$ and $18_2$, and the shaping male molds $19_1$ and $19_2$ reach the position just above, under, left of and right of the shaft parts $1_1$, $1_2$ and $1_3$ and the position of the shaft parts $1_1$, $1_2$, and $1_3$ is set as above-mentioned, the air cylinder 62 advances the heating chamber and keeps it advanced during the entire period of time when the timer is working. An infrared heating lamp 63 is always energized.

A compression molding means has tie-bars 64 which are fastened to the frame 4 at the upper ends and to a fixed surface plate 65 of the compression molding means allowing the whole compression molding means to hang down from the frame 4. A hydraulic cylinder 66 is mounted on the fixed surface plate 65. A ram 67 forming part of the hydraulic cylinder 66, has its top end attached to the bottom of a movable surface plate 68. Slide holes 69 which are bored through the four corners of the movable surface plate 68 vertically slidably receive the tie-bars 64. When the hydraulic cylinder 66 works to lift the ram 67, the movable surface plate 68 rises along the tie-bars 64, and when the hydraulic cylinder 66 works to lower the ram 67, the movable surface plate 68 goes down along the tie-bars. A shaping female mold 70 is mounted on the movable surface plate 68, mating with the shaping male molds $19_1$ and $19_2$ on the rotation frame 15 and is capable of moving vertically together with the movable surface plate 68. Heating means 91 is provided in the shaping mold 70 and is always heated.

A motor 26 having reduction gears serves to rotate turn tables $16_1$, $16_2$, $17_2$ (refer to FIGURE 12). One of the reduction gears is at 27. A clutch actuating cylinder 39 is provided on frame 4 for fixing the position of the turn table (refer to FIGURE 9). A transfer valve 71 is provided in the shaft 1, a detailed explanation of which is given hereinafter in connection with FIGURES 4, 5, and 6. A claw cylinder 41 is provided on frame 4. A guide 43 is also provided therefor, a detailed explanation of which will be given in connection with FIGURE 10. As indicated in FIGURE 3, the shaft parts $1_1$, $1_2$ and $1_3$ are rotated by the rotation of an oil pressure motor 5 transmitted to reduction gears 7 through a shaft coupling 6 and the reduced velocity rotation is transmitted to a gear 9 mounted on the shaft $1_3$ through a gear 8 on the output side of the reduction gears 7 in order to intermittently rotate shaft 1 in the direction of arrow $a$ through an angle of 90° for each rotation movement. In order to make the intermittent rotation accurate, there is fastened to shaft part $1_3$ a circular position-fixing plate 11 having 4 holes circumferentially spaced precisely at angles of 90° around the shaft $1_3$. During the time of rotation of the shaft parts $1_1$, $1_2$, and $1_3$, a position fixing pin 12 is pressed against the circumferential surface of the position fixing plate 11 by an air cylinder 13 mounted on the top of the frame 4. When the shaft parts $1_1$, $1_2$, and $1_3$ rotate to a desired position, the fixing pin 12 enters a hole 10 in the position fixing plate 11 and stays there for a fixed period of time by the action $a$ timer (not shown in the figures). When the shaft parts are to rotate again, the position fixing pin 12 is withdrawn from the hole 10 of the position fixing plate 11 by the action of air cylinder 13 and during the rotation of the shaft parts $1_1$, $1_2$, and $1_3$, it is pressed again against the circumferential surface thereof. A guide 14 is provided for the above-mentioned position fixing pin 12. Thus the intermittent rotation through angles of 90° is carried out.

Referring now to FIGURES 4, 5 and 6, the transfer valve 71 has a vacuum chamber 73 connected with a vacuum chamber 72 in the shaft parts $1_1$ and $1_2$, and which is always maintained at a reduced pressure, being connected with the suction side of a blower (not shown in the figures). When the turn tables $16_1$ or $16_2$ enters the preforming chamber 46, the vacuum chamber 73 of the transfer valve 71 is in communication with the inside of the turn table $16_1$ or $16_2$ and draws a current of air through the screen $18_1$ or $18_2$. At this moment glass fibers produced by cutting the glass fiber rovings 52 to a suitable length are sent into the preforming chamber 46 through the charging pipe 51 to preform the glass fibers upon the screen $18_1$ or $18_2$. The communication of the vacuum chamber 73 of the transfer valve 71 and the inside of the turn table $16_1$ or $16_2$ is maintained until the shaft parts $1_1$, $1_2$, and $1_3$ rotate through an angle of 180° and the turn table $16_1$ or $16_2$ enters the heating chamber 59. However when the transfer valve 71 is at a standstill, during the course of the rotation of the turn table $16_1$ or $16_2$ which rotates with the rotation of the shaft parts $1_1$, $1_2$ and $1_3$ to the position just under the shaft parts $1_1$, $1_2$, and $1_3$ i.e. just above the shaping female mold 70 of the compression molding means, the communication of the vacuum chamber 73 of the transfer valve 71 with the inside of the turn table $16_1$ or $16_2$ is cut off. Accordingly, as soon as the turn table $16_1$ or $16_2$ situated in the heating chamber 59 starts to rotate, a motor 76 having reduction gears, as shown in FIGURE 7, is put in motion to rotate a crank 79 by way of gears 77, and 78, oscillate a connecting rod 80, and rotate, by a lever 81, an air supply pipe 75 (refer to FIGURE 2) connected with the transfer valve through an angle of 45° in the same direction as the shaft parts $1_1$, $1_2$, and $1_3$ are rotated and hold it in the rotated position for a definite period of time. By this means the communication of the vacuum chamber 73 of the transfer valve 71 with the inside of the turn table $16_1$ or $16_2$ is not discontinued. When the shaft parts $1_1$, $1_2$, and $1_3$ have finished their rotation, the turn table $16_1$ or $16_2$ has entered the definite position just under the shaft parts $1_1$, $1_2$, and $1_3$, the position of the shaft parts $1_1$, $1_2$, and $1_3$ has been fixed by the above-mentioned operations, the clutch 24 has been loosened by the air cylinder 33, refer to FIGURE 11) the position of the turn table has been fixed by the air cylinder 39, the claw cylinder 41 has started working to press the claw 44 against the claw 45, (refer to FIGURE 8) and the ram 67 has risen to bring the shaping female mold 70 around the preforming screen $18_1$ or $18_2$ fitted on the turn table $16_1$. When the motor having the reduction gears 76 is put in motion so that the transfer valve 71 rotates by way of the gears 77, 78, the crank 79, the connecting rod 80 and the lever 81 in the direction opposite to the above-mentioned case through an angle of 45° and stops (refer to FIGURE 7). At this moment the communication of the inside of the turn table $16_1$ or $16_2$ with the vacuum chamber 73 of the transfer valve 71 is completely cut off and instead the high pressure chamber 74 of the transfer valve 71 is in communication with the high pressure conduit 83 of the turn-table support 82 mounted on the shaft $1_2$ and the inside of the turn-table $16_1$ or $16_2$. The other end of the high pressure chamber 74 of the transfer valve 71 is connected with the air pipe 75, a rotary coupling 84, (refer to FIGURE 2) and a high pressure tank (not indicated in figures) through a magnet valve, which works for a certain period of time to send compressed air from the high pressure tank to the inside of the turn table $16_1$ or $16_2$ through the rotary coupling 84, the air pipe 75, the high pressure chamber 74 of the transfer valve 71 and the high pressure conduit 83 of the turn-table support 82, thereby forcing the preformed glass fibers on the preforming screen $18_1$ or $18_2$ into the cavity 85 of the shaping female mold 70 by blowing the high pressure air through the preforming screen $18_1$ or $18_2$. Thereafter the magnet valve is closed, the high pressure air is cut off and the ram 67 goes down. As above-mentioned, the rotation of the transfer valve 71 through an angle of 45° takes place when the turn table $16_1$ or $16_2$, and with it the preforming screen $18_1$ or $18_2$ rotates through an angle of 90° from the position in the heating chamber 59 to the position just under the shaft parts $1_1$, $1_2$, and $1_3$, namely just above the shaping female mold 70. When the turn table $17_1$ or $17_2$, namely the shaping male mold $19_1$ or $19_2$ rotates from the position in the heating chamber 59 to the position just under the shaft parts $1_1$, $1_2$, and $1_3$, namely just above the shaping female mold, the transfer valve 71 is not rotated through the angle of 45° and is at a standstill. When the shaping male mold $19_1$ or $19_2$ arrives at the position just above the shaping female mold 70, the clutch 24 is released by the air cylinder 33, the position of turn table $17_1$ or $17_2$ is fixed by the air cylinder 39, the claw 45 is engaged by the claw 44 by the action of the claw cylinder 41, and the hydraulic cylinder 66 raises the ram 67 to effect the compression molding for a definite period of time between the shaping female mold 70 which has received the above-mentioned preformed material and the male mold $19_1$ or $19_2$ upon the turn table $17_1$ or $17_2$. The role of the claw 45 mounted on the turn table $17_1$ or $17_2$ and the claw 44 fitted on the claw holder 42 is important. They prevent the force acting upon the turn-table $17_1$ or $17_2$ from affecting the shaft parts $1_1$, $1_1$, and $1_3$, bearings 2 and 3, etc. They direct the total pressure working upon the turn table $17_1$ or $17_2$ to the claw 45 of the turn table $17_1$ or $17_2$, to the claw 44, to the claw holder 42, to the frame 4 and ultimately to the tiebar which is stressed in tension and thus keep other parts free from the influence of the pressing force.

After the compression molding for a definite period of time is finished, the hydraulic cylinder 66 lowers the ram 67 down to a definite position and stops there while releasing the shaping female mold from the shaping male mold $19_1$ or $19_2$. As soon as the male mold starts down, the magnet valve (not shown in the figure) opens for a certain period of time to send high pressure air from the high pressure tank (not shown in the figure) through the rotary joint 84, the air supply pipe 75, the high presure chamber 74 of the transfer valve 71, the high pressure conduit 87 of the turn table support 86, the air conduit 88 of the turn table $17_1$ or $17_2$, to the valve 89 in the shaping male mold $19_1$ or $19_2$ which has finished the above-mentioned compression molding. Opening of this valve 89, causes the product to be released from the shaping male mold $19_1$ or $19_2$ and it falls into the shaping female mold 70. After the release of the product is finished, the magnet valve (not shown in the figure) is closed, cutting off the supply of the high presure air to the valve 89 which returns to the closed state.

On each of the turn tables $16_1$, $16_2$, $17_1$ and $17_2$ there is mounted a spur gear 20 as shown in FIGURE 12 which is always in mesh with a spur gear 21 fixed on a shaft supported by bearings mounted on the rotation frame 15 and so constructed that rotation is transmitted from output shaft 25 of clutch 24 by way of bevel gears 22 and 23 (refer to FIGURE 11 and FIGURE 12). When the clutch 24 is connected, the continuous rotation of a driving gear 38 of the clutch to which the rotation of a motor 26 having variable reduction gears is transmitted through gears 27, 28 and 29, is transmitted to the turn tables $16_1$, $16_2$, $17_1$ and $17_2$ and causes them to turn the preforming screens $18_1$ and $18_2$ and the shaping male molds $19_1$ and $19_2$ together with the turn tables $16_1$, $16_2$, $17_1$ and $17_2$. The clutch is capable of sliding parallel along its output shaft 25 and its revolution is restricted by a slidable key 30. Normally it is pressed by spring 37 against a claw 31 fixed on a boss of the driving gear 38 which is normally performing an idle revolution around the output shaft 25. The claw 32 of the clutch 24 is thus held in engagement with the claw 31 of the driving gear 38 and accordingly the clutch is in the connected state. With the turning of the rotation frame 15 (refer to FIGURES 1 and 2), the clutch 24 comes to the position under the shaft parts $1_1$, $1_2$, and $1_3$, and then as shown in FIGURE 11, by the action of an air cylinder 33 a lever 34 is pushed and a roller 36 which is fixed to the lever 34 and slides in a recessed groove 35 on the side of the surface of clutch 24 makes the clutch 24 slide on the trailing shaft 25 toward the left disengaging the claws 32 of the clutch 24 and the claws 31 of the driving gear 38, to stop the rotation of the output shaft 25. The action of air cylinder 33 which disengages the clutch is initiated by pushing a limit switch (not shown in the figures) fixed on the frame 4 (FIGURES 1 and 2) with a cam (not shown in the figure) fixed to the side of turn table $16_1$, $16_2$, $17_1$ or $17_2$ at the time when the preforming screens $18_1$, $18_2$ and shaping male molds $19_1$ or $19_2$ rotate with the rotation of the rotation frame 15 and stop at a position directly under the shaft parts $1_1$, $1_2$, and $1_3$. From the time when the cam pushes the microswitch, the air cylinder 33 is brought into operation for a fixed period of time of the action of a timer (not shown in the figures) so as to maintain the clutch out of engagement. In this instance, the rotation of the turn table situated just under the shaft parts $1_1$, $1_2$, and $1_3$, i.e. $16_1$, $16_2$, $17_1$ or $17_2$ (the turn table $17_1$ in FIGURE 1) is suspended.. By the action of four air cylinders 39 which are mounted under the frame 4 to fix the position of the turn tables, the position-fixing plates 40 (in FIGURES 8 and 9) fitted on the turn tables $16_1$, $16_2$, $17_1$ or $17_2$ are pushed simultaneously from the four directions to fix the turn tables $16_1$, $16_2$, $17_1$ or $17_2$ at a predetermined position. Then the claw cylinder 41 operates and pushes out a claw holder 42 along a guide 43 to push the claw 44 mounted on the claw holder 42 against the claw 45 fitted on the turn table $16_1$, $16_2$, $17_1$ or $17_2$ for a definite period of time. These cylinders 39 for fixing the position of the turn table and claw cylinders 41 performs a reverse action during the time when the clutch actuating cylinders 33 are holding the clutch, so as to release the connection of the claws 44 with 45 and release turn table $16_1$, $16_2$, $17_1$ or $17_2$.

The operation of the apparatus of the present invention will be explained hereinafter.

When the rotation of the shaft parts $1_1$, $1_2$ and $1_3$ stops and the positions of the shaft parts $1_1$, $1_2$, and $1_3$ is fixed by the air cylinder 13 at the position shown in FIGURE 1, the preforming chamber 46, the door 56 of the spray chamber 54 and the heating chamber stop at the respective fixed positions (the positions shown in FIGURE 1) by the action of the individual air cylinders 49, 57, and 62. At this moment, the preforming screen $18_1$ is in the preforming chamber 46 and the cutter 50 is working to cut the glass fiber rovings 52 into a length of 1" to 2" and send them into the preforming chamber 46. Since the inside of the preforming screen $18_1$ is in communication with the vacuum chamber 73 of the transfer valve 71 which is always maintained at a reduced pressure, suction current is flowing through the perforations in the screen. Since the clutch 24 is connected, the preforming screen $18_1$ is rotating around the shaft perpendicular to the shaft parts $1_1$, $1_2$, and $1_3$. Accordingly, the glass fibers delivered to the above-mentioned preforming chamber 46 are uniformly distributed on the preforming screen $18_1$ while riding on the suction flow. When a certain amount of preforming is finished, the cutter 50 stops and the feed of the glass fibers into the preforming chamber 46 is suspended. At this moment, the preforming chamber 46 is released, the door 56 of the spray chamber 54 is closed and the heating chamber 59 is released by their individual air cylinders 49, 57 and 62, the shaft parts $1_1$, $1_2$, and $1_3$, is released, the shafts $1_1$, $1_2$, and $1_3$ rotate in the direction of arrow $a$ in FIGURE 1 through an angle of 90° and the positions of the shaft parts $1_1$, $1_2$ and $1_3$ are fixed by the air cylinder 13. During the time of this rotation, the vacuum chamber 73 of the transfer valve 71 and the preforming screen $18_1$ are also kept in communication and the detachment of preformed glass fibers from preforming screen $18_1$ is prevented. When the position shaft parts $1_1$, $1_2$, and $1_3$ is fixed, the preforming chamber 46, the door 56 of the spray chamber 54 and the heating chamber 59 are returned to the previous fixed positions (the position of FIGURE 1) by individual air cylinders 49, 57 and 62 and stay there. At this moment, the above-mentioned preformed shape of glass fibers on screen $18_1$ is in the spray chamber 54 and a spray gun 58 in the spray chamber 54 performs the spraying of a fixed mount of gelcoat resin which is also effective as a binder, upon the preformed glass fibers. When this operation is finished, the preforming chamber 46 is released, the door 56 of the spray chamber 54 is closed and the heating chamber 59 is released by the action of individual air cylinders 49, 57 and 62, the shaft parts are released by the air cylinder 13, the shaft parts $1_1$, $1_2$ and $1_3$ rotate in the direction of arrow $a$ indicated in FIGURE 1 through an angle of 90° and the positions of the shaft parts $1_1$, $1_2$ and $1_3$, are fixed by the air cylinder 13. During the time of this rotation, the vacuum chamber 73 of the transfer valve 71 is in communication with the preforming screen $18_1$ and the glass fibers preformed on the preforming screen $18_1$ are held thereupon. When the shaft parts $1_1$, $1_2$ and $1_3$ are fixed in position, the preforming chamber 46, the door 56 of the spray chamber 54 and the heating chamber 59 return to their original fixed positions (the positions indicated in FIGURE 1) and stop there. At this moment the preforming screen $18_1$ which holds the preformed glass fibers sprayed with binder-gelcoat resin, is in the heating chamber 59 being preheated by the infrared heating lamp 63. On the other hand, the spraying of gelcoat resin on the male mold $19_1$ is occurring in the spray chamber 54. To the preforming screen $18_2$ newly entering the preforming chamber 46, the glass fibers are applied by the same operation as in the case of the above-mentioned preforming screen $18_1$. When these operations are finished, the preforming chamber 46 is released, the door 56 of the spray chamber 54 is opened and the heating chamber 59 is withdrawn again by the individual air cylinders 46, 57 and 62, the shaft parts are released by the air cylinder 13, the shaft parts $1_1$, $1_2$ and $1_3$ rotate in the direction of the arrow $a$ indicated in FIGURE 1 through an angle of 90° and then the positions of the shaft parts $1_1$, $1_2$ and $1_3$ are fixed by the air cylinder 13. During the time of this rotation, the transfer valve 71 rotates in a direction the same as that of the shaft parts $1_1$, $1_2$ and $1_3$ through an angle of 45°, the vacuum chamber 73 of the transfer valve 71 is connected with the preforming screens $18_1$ and $18_2$ in order to hold the preformed glass fibers thereupon. When the position of the shaft parts $1_1$, $1_2$, $1_3$ is fixed, the preforming chamber 46, the door 56 of the spray chamber 54 and the heating chamber 59 return to the original fixed positions (the positions indicated in FIGURE 1) by the action of air cylinders, 49, 57, and 62. At this moment, the preforming screen $18_1$ which has had the above-mentioned preforming and the spraying of binder-gelcoat resin completed with respect thereto, arrives at the position just above the shaping female mold 70 on the movable surface plate 68, and actuation of a limit-switch (not shown in the figure) by a cam (not shown in the figure) on the slide of the turn table $16_1$, the air cylinder 33 is actuated, the clutch 24 is disengaged, and simultaneously with the stopping of rotation of the turn table $16_1$, the four cylinders 39 start operating to fix the position of turn table $16_1$ and further the claw cylinder 41 starts operating to press the claw 44 of the claw holder 42 against the claw 45 on the turn table $16_1$. Then the hydraulic cylinder 66 is operated to raise the ram 67 and to make the shaping female mold 70 contact the preforming screen $18_1$ which has had the glass fibers preformed thereon as above-mentioned and finished by the spraying a binder-gelcoat resin thereon and preheating. At the same time, the transfer valve 71 which has been standing still after rotation through an angle of 45°, rotates in the opposite direction to return to and stop at the original position, the communication between the vacuum chamber 73 of the transfer valve 71 and the preforming screen $18_1$ is completely cut off, and then the communication between the high pressure chamber 74 of the transfer valve 71 and the preforming screen $18_1$ is established, the magnet valve opens for a certain period of time to supply the compressed air. Simultaneously the oil cylinder 66 starts operating to lower the ram 67 and the shaping female mold 70, than the compressed air is blown out through the holes of the preforming screen $18_1$ and the glass fibers which have been deposited on the preforming screen $18_1$, preformed and coated with the gelcoat resin, fall into the inside of the shaping mold 70. On release of the mold, the magnet switch immediately closes, the supply of compressed air is cut off, the shaping female mold 70 with the glass fibers therein goes down and stops at the fixed position. At the same time the claw cylinder 41 and the cylinder 39 for fixing the position of the turn table operates in the opposite direction to withdraw the claw 44 from the claw 45 and release the turn table $16_1$ and the air cylinder 33 operates in the opposite direction to engage the clutch 24 and rotate the turn table $16_1$. On one hand, the preheating is going on at the shaping male mold $19_1$ which has entered the heating chamber 59 and has been sprayed with gelcoat resin. On the other hand, the spraying of a fixed amount of binder-gelcoat resin upon the preformed glass fibers is carried out at the screen $18_2$ which has entered the spray chamber 54 and upon which glass fibers have been deposited. At the finish of these operations on the preforming screen $18_1$, the shaping male mold $19_1$ and the preforming screen $18_2$, the preforming chamber 46 is withdrawn, the door 56 of the spray chamber 54 is opened and the heating chamber 59 is withdrawn by the respective air cylinders 49, 57, and 62, the means for fixing of the shaft parts $1_1$, $1_2$ and $1_3$ in position is withdrawn by the air cylinder 13, the shaft rotates in the direction of arrow $a$ indicated in FIGURE 1 and the position of the shaft is again fixed by the air operation of cylinder 13. At the time of this rotation the transfer valve 71 is at a standstill. When the fixing of the shaft parts $1_1$, $1_2$, and $1_3$ in position is finished, the preforming chamber 46, the door 56 of the spray chamber 54 and the heating chamber 59 are returned to the original positions by the respective air cylinders 49, 57 and 62. At this moment, the shaping male mold $19_1$ which has been sprayed with gelcoat resin and preheated is brought to the position just above the shaping female mold 70 which has the preformed glass fibers therein a limit switch (not shown in the figure) on the frame 4 is actuated by a cam (not shown in the figure) on the side of the turn table $17_1$ to actuate the air cylinder 33, to disengage the clutch 24 and to stop the rotation of the turn table $17_1$. Simultaneously the four cylinders 39 for fixing the position of turn table are operated to fix the position of turn table $17_1$ and further the claw cylinder 41 is operated to press the claw 44 of the claw holder 42 against the claw 45 of the turn table $17_1$. Then as soon as a fixed amount of a composition of polyester resin is poured into the shaping female mold 70 which has the preformed glass fibers therein, the hydraulic cylinder 66 is operated to raise the ram 67 whereby the shaping female mold 70 is brought to contact with the above-mentioned shaping male mold $19_1$ and the compression moulding is performed for a fixed period of time between the shaping molds. When the heating and compression molding is finished, the magnet valve (not shown in the figure) opens for a certain period of time to send compressed air from the high pressure chamber 74 of the transfer valve 71 to the valve 89 of the shaping male mold $19_1$ passing through the air conduit 88 in the inside of the turn table $17_1$. As soon as the valve 89 opens, the hydraulic cylinder 66 operates to lower the ram 67 and the shaping female mold 70 whereby the product which has been attached to the shaping male mold $19_1$ is stripped from the male mold and falls into the female mold 70. When the above-mentioned releasing is finished, the magnet valve immediately closes to cut off the supply of the high pressure air and the valve 89 returns to the original closed state by the action of the spring 90. The female mold holding the product stripped from the shaping male mold $19_1$ therein, is moved down. The product is taken out after the latter stops at the fixed position. During the course of the downward movement of the shaping female mold 70, the claw cylinder 41 and the cylinder 39 for fixing the position of turn table are operated to release the claw 44 from the claw 45 and release the turn table $17_1$ and the air cylinder 33 is operated in the direction to engage the clutch 24 and to rotate the turn table $17_1$.

As for the preforming screen $18_2$ which has entered the heating chamber 59, with the glass fibers thereon sprayed with the binder-gelcoat resin, the preheating is carried out as in the case of the above-mentioned performing screen $18_1$ and as for the shaping male mold $19_2$ which has entered the spray chamber 54, the spraying with the gelcoat resin resin is carried out as in the case of the above-mentioned spraying of male mold $19_1$. Further in the preforming chamber 46, there is positioned at this moment the preforming screen $18_1$ which has just finished one cycle of operation and to which glass fibers are being applied. The same operations are repeated successively with the rotating of the shaft parts $1_1$, $1_2$ and $1_3$ in the direction of arrow $a$.

In the foregoing disclosure, glass fibers are used as a preforming material but the preforming material suitable for the present apparatus is not limited only to glass fibers. Materials which are prepared by impregnating in advance a resin composition in fiberous materials such as glass fibers i.e. so-called "preprages" are also useful. However in such a case there is the advantage that injection of resin composition into the female mold before the compression molding can be omitted.

In the foregoing disclosure the case where metal molds are used as the shaping molds is illustrated but rubber molds having a vacant space in their inside can also be used. In such a case in carrying out compression molding by the use of female molds it is possible to make the high pressure chamber 74 of the transfer valve 71 communicate with the inside of the rubber mold so as to send high pressure air to the inside of the rubber mold during the time of compression molding. In this case, after completion of the molding, the articles can be held in the female mold while readily being detached from the rubber mold by releasing the high pressure air from the inside of the rubber mold to the open air e.g. using a magnet valve.

In the molding apparatus of the present invention, there is provided with a shaft which is capable of rotating intermittently past a compression molding means, and having preforming screens and shaping molds fitted alternately around the said shaft. With the intermittent rotating of the shaft, the preforming screens having preforming and the shaping molds, stop alternately adjacent the compression molding means which has a shaping mold which is complementary to the above-mentioned shaping mold mounted on the shaft. Synchronized with the above-mentioned motion of the shaft, the shaping mold of the compression molding means is lifted or lowered to receive the preformed articles from the preforming screen and to effect compression molding together with the shaping mold fitted on the shaft continuously and efficiently whereby desired reinforced plastic articles can be obtained.

What is claimed is:

1. An apparatus for producing reinforced molded plastice articles, comprising a frame, a hollow shaft rotatably mounted on said frame, shaft rotating means coupled to said shaft for rotating said shaft intermittently, a plurality of preforming screens and shaping molds mounted alternately at spaced positions around said shaft, a preforming chamber mounted on said frame adjacent the path of said screens and molds and having means for supplying a reinforcement material onto the preforming screens, and screens and molds passing through said preforming chamber during rotation of said shaft, a compression molding means on said frame having a further shaping mold complementary in shape to the molds on said shaft and movable back and forth toward and away from a position in the path of said molds and screens, said preforming chamber and compression molding means being positioned so that when a mold on the shaft stops at the position of the compression molding means, a preforming screen is in the preforming chamber, a transfer valve in said shaft and around which said shaft rotates, and conduit means in said preforming screens for communicating with said transfer valve when said preforming means is in said preforming chamber, said transfer valve being adapted to be coupled to a source of vacuum for placing the preforming screens under vacuum when they are in the preforming chamber.

2. An apparatus as claimed in claim 1 in which said transfer valve includes means for directing a high pressure gas to molds and screens when said molds and screens are at the position adjacent said compression molding means, said molds on said shaft having conduit means for communicating with said transfer valve, said transfer valve being further adapted to be coupled to a source of gas under pressure for placing the preforming screens and molds with said gas under pressure when adjacent said compression molding means.

3. An apparatus as claimed in claim 2 in which each of said shaping molds on said shaft has an aperture in the end thereof, a valve member mounted in said aperture for closing said aperture, spring means biasing said valve member to the closed position inwardly of the mold, the valve member having a surface thereon which forms part of the surface of the mold when the valve member is closed, said valve member being in communication with said conduit means in said mold and being forced outwardly of the mold when high pressure gas is supplied thereto for stripping the article molded thereon from the mold.

4. An apparatus as claimed in claim 1 further comprising a spraying chamber on said frame adjacent the path of said molds and preforming screens and a heating chamber on said frame adjacent the path of said molds and preforming screens, said molds and preforming screens being movable into and out of said chambers in succession during the intermittent movement around said shaft, said spraying chamber and said heating chamber being in the recited order between the preforming chamber and the position adjacent the compression molding means along the path of the molds and preforming screens and being spaced so that when a preforming screen is in the preforming chamber, a mold is in the spraying chamber and a preforming screen is in said heating chamber.

5. An apparatus as claimed in claim 1 in which said transfer valve is rotatable within said shaft, and further comprising means coupled to said transfer valve for holding it in a non-rotated position when a preforming screen is in the preforming chamber, and rotating it partially in the direction of rotation of the shaft when the shaft is rotated in order to maintain communication of the preforming screen with the vacuum, and rotating the transfer valve back to the non-rotated position after a period of time.

6. An apparatus as claimed in claim 1 further comprising a claw on said frame movable back and forth into the path of the molds and preforming screens when they are in position opposite the compression molding means, and a further claw on each of the molds engage by said first-mentioned claw when it is extended into the path of the molds on the shaft, whereby the pressure of said compression molding means is transmitted through the claws to the frame instead of to the shaft.

7. An apparatus as claimed in claim 1 in which said molds and preforming screens on said shaft are rotatably mounted on said shaft for rotation around an axis perpendicular to the axis of rotation of the shaft, and means coupled to said molds and preforming screens for rotating them at least when they are in the preforming chamber.

References Cited

UNITED STATES PATENTS

| | | | |
|---|---|---|---|
| 1,920,292 | 8/1933 | Chaplin | 162—391 X |
| 2,234,979 | 3/1941 | Randall et al. | 162—377 |
| 2,307,022 | 1/1943 | Chaplin | 162—392 |
| 3,016,090 | 1/1962 | Chaplin | 162—392 X |
| 3,132,991 | 5/1964 | Hornbostel et al. | 162—392 |
| 3,181,202 | 5/1965 | Martelli et al. | 18—21 X |
| 3,275,498 | 9/1966 | Roth et al. | 162—392 X |

WILBUR L. McBAY, *Primary Examiner.*